H. NIEMANN.
AUTOMATIC GAS CUT-OFF.
APPLICATION FILED AUG. 17, 1908.
910,221.
Patented Jan. 19, 1909.
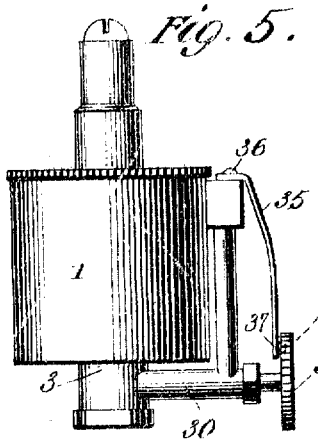
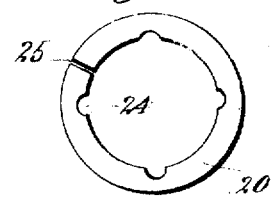
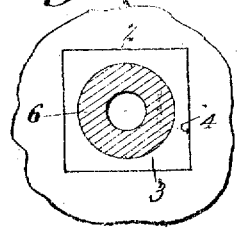
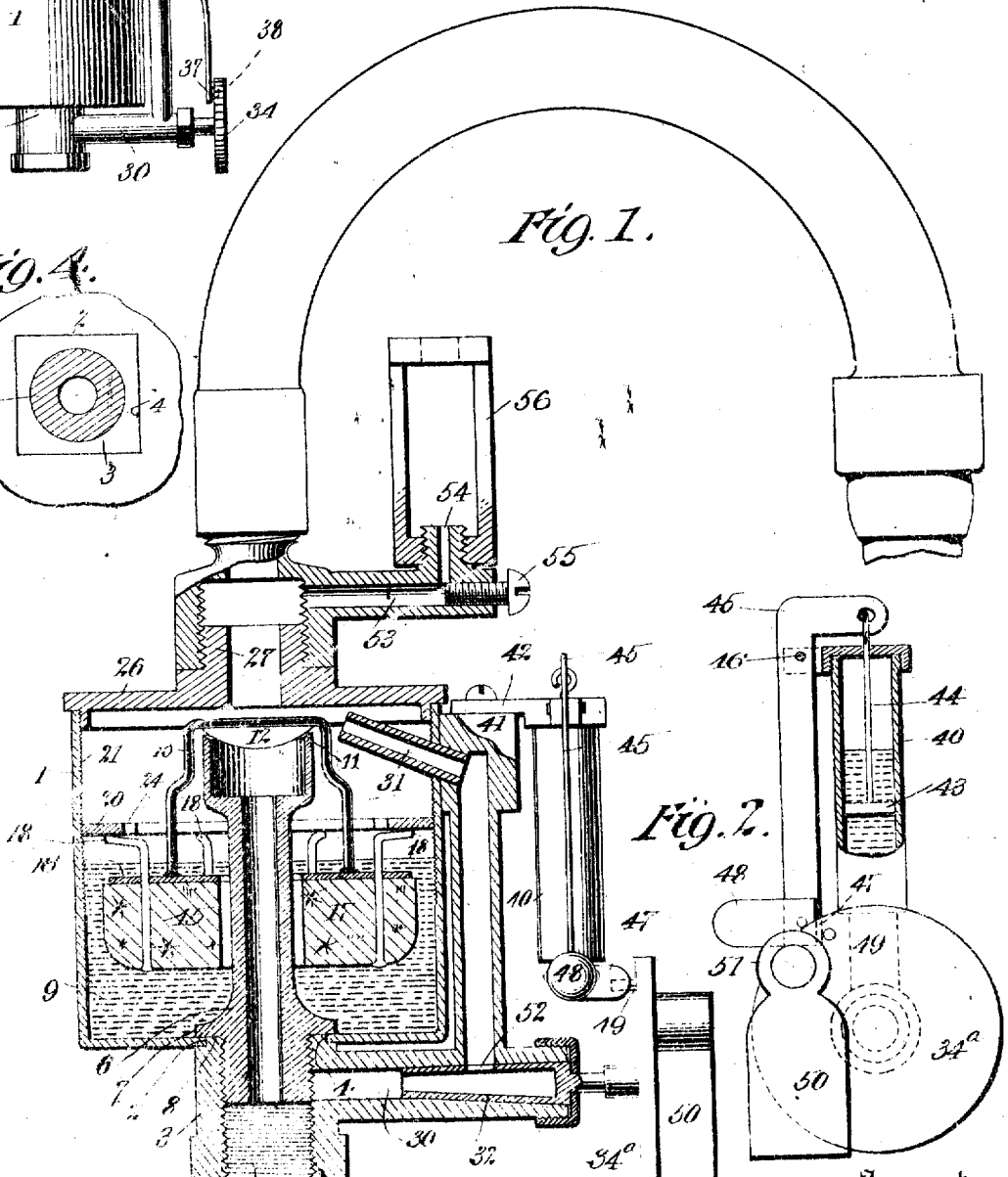
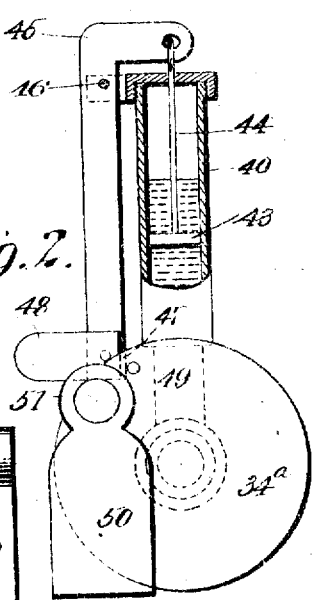
Witnesses:
Inventor
Henry Niemann.
By his Attorneys

UNITED STATES PATENT OFFICE.

HENRY NIEMANN, OF NEW YORK, N. Y.

AUTOMATIC GAS CUT-OFF.

No. 910,221.　　　　Specification of Letters Patent.　　　　Patented Jan. 19, 1909.

Application filed August 17, 1906. Serial No. 448,801.

*To all whom it may concern:*

Be it known that I, HENRY NIEMANN, a citizen of the United States, residing at the city of New York, in the borough of Brooklyn and State of New York, have invented certain new and useful Improvements in Automatic Gas Cut-Offs, of which the following is a full, clear, and exact description.

My invention relates to an attachment for use with gas fixtures, the purpose of which is to cut off the flow of gas from the burner or outlet orifice entirely automatically upon the occurrence of certain prescribed conditions, or in some cases after a predetermined time interval. In the most ordinary form of the invention I provide for automatically cutting off the flow of gas in case the flame at the burner is extinguished.

In some of its aspects the present invention is in the nature of an improvement on the automatic gas cut-off set forth in my prior application Serial No. 423,322, filed Mar. 26, 1908, Patent #899184, Sept. 22, 1908, the present application containing certain additional features and advantages over the prior device. Among these features of improvement is the provision of means, or a by-pass, whereby the gas can be instantly turned on at any burner regardless of a previous actuation of the automatic cut off, and without waiting for the cut-off appliance to be heated in the manner of my prior application.

In another aspect the present invention has broadly new features of improvement, notably the provision of means for automatically restoring the device to a condition where it performs its automatic gas-cut-off functions after an initial manipulation has been made to start the device by establishing a by-pass as above mentioned.

I provide means, within my invention, whereby the flow of gas to a burner can be automatically cut off at a certain time interval after a predetermined manipulation or act, such as blowing out a special pilot flame. The device can also be arranged to extinguish a gas flame a certain number of hours after it has been lighted.

With these and various other objects in view, my invention consists in the features of construction and combination as hereinafter set forth and claimed.

In the drawings: Figure 1 is a vertical sectional view of a gas cut-off appliance embodying the principles of my invention; Fig. 2 is a detail view of part of the same; Figs. 3 and 4 are other detail views, and Fig. 5 is a side view showing a modification.

Referring to the drawings in which like parts are designated by the same reference sign, 1 designates a cup or chamber of generally cylindrical outline which forms the casing of the automatic cut-off appliance. In practice I make the cup 1 of sheet metal, stamped and drawn in the form shown, with a square perforation 2 in its lower face.

3 designates a collar with a squared portion 4 adapted to fit in the hole 2, and a threaded recess 5 adjacent thereto which receives a correspondingly threaded nipple on a tube 6 extending upward into the cup 1. The lower end of the tube 6 has a flange 7 which coöperates with the flange 8 on the collar 3 so as to firmly engage and clamp the lower face of the cup 1, with the square portion 4 of the collar closely received in the square perforation of the cup. At its lower end the collar 3 is internally threaded to fit interchangeably upon any gas fixture.

The upper end of the tube 6 has a valve seat 11 formed by beveling or coning inward the edge thereof, and adapted to engage and coöperate with this seat is a valve member 12 fixed to a wire or similar frame 13 of U-shape, which has depending prongs or extremities fastened to a float 15. I make the float 15 of annular shape loosely surrounding the tube 6 and loosely fitting within the chamber of the cup or casing 1. The connection of the frame 13 with the float 15 is conveniently made by a plate 16 fastened to the float by pins 17 which project upward through the plate, being soldered thereto, and are deflected outward at their extremities 18. As many of these pins 17 may be provided as desired, being spaced at equal distances about the plate 16, and their bent ends 18 are so deflected that they are all in the same plane when the valve member 12 is properly engaged upon its valve seat. 20 designates a guide ring which is fitted into the cup 1 so as to form a ledge directly above these extremities 18. In order that the guiding ring 20 shall be fixed in a perfectly level plane and can be adjusted vertically, I thread the interior of the cup 1 with fine micrometer threads 21, the exterior of the ring 20 being correspondingly threaded so as to screw downward and be placed within the cup to a variable or adjustable degree. By screwing the guiding ring 20 downward, until it contacts with the prongs 18 and presses the valve 12 on its seat, and then relieving the screw by a fraction of a turn, it is possible to provide for a perfectly predetermined amount of movement of the valve away from its seat, amounting to a few thousandths of an inch in ordinary cases. The movement is so slight that the guiding ring exerts a substantially perfect action in holding the valve member properly positioned over its seat, and the float 15 centrally located within the cup 1. The former function is obviously necessary, and the latter function is important or desirable, in practice, because the action of the float is interfered with if it rubs against the surrounding walls of the cup or the central tube 6. All of the adjustments being properly made, ordinary wax or other congealing, contractile substance 9, such as set forth in my prior application above referred to, is poured into the cup 1 in sufficient quantity to elevate the float and raise the valve 12 off its seat. When the substance cools, the float falls; in fact is sucked downward by the cohesion of the congealing substance, and firmly closes the valve 12 upon its seat.

A feature of construction of the guiding ring 20 lies in the interior notches 24 which can be engaged by a wire bent into U-shape so as to screw the guiding ring into place. The guiding ring 20 is split in practice, as at 25, so that it will spring outward and tightly bind itself in the position to which it is adjusted within the cup 1.

In use, a cover 26 is screwed upon the cup or casing 1 so as to wholly inclose the interior mechanism. This cover has a threaded nipple 27 upon which an ordinary gas burner may be applied. In use the heat conducted downward from the burner keeps the entire cut-off appliances warm,—so warm that the congealing, contractile substance is melted and the valve is kept elevated off its seat; this result being due to the considerable expansion of wax and like substances which takes place when they are melted, as fully set forth in my prior application.

The device as thus far described is complete for many practical purposes; for example, in use with a burner which is designed to be always lighted in cellarways and dark passages. The burner being always lighted, the gas cut-off is kept ineffective by the continuously emanated warmth from the burner, but in case the flame should be accidentally extinguished or blown out, or the flow of gas temporarily interrupted, then the heat emanation would cease and the gas cut-off appliance of the present invention would act. This device is also useful in some cases where lights are to be extinguished after a certain interval, by so proportioning the parts that the heat emanated from the burner is not quite sufficient to supply the loss from radiation, etc. The proportion may be so adjusted that the gas cut-off will act after a certain number of hours, and owing to the fact that the wax congeals rapidly when a certain critical point of temperature is reached, the cut-off action is quite rapid, as is desirable. With that use of the appliance, as thus far described, it would be necessary to have a special flame or attachment for initially warming it. I provide means by which such attachment is rendered unnecessary, and which forms part of the present invention. 30 designates a by-pass or passage from the nipple 3 upward around the outside of the cup 1 and entering said cup 1 at a point 31 above the level of the congealing, contractile substance therein. The by-pass 30 is conveniently formed by a hollowed out angular extension from the collar 3, which terminates in a block or lug 41 adjacent to the upper side of the cup 1, to which it is soldered at 41'. 32 designates a valve in the passage 30 and which may be the ordinary turn cock variety and operated by a thumb-wheel 34. 35 (see Fig. 5) designates a spring blade fixed to the chamber 1 at any convenient point, preferably at the point shown, by a screw 36, and which depends into proximity to the rear face of the thumb-wheel 34. At its lower extremity is an outwardly extending projection 37 adapted to engage a notch 38 in the rear face of the wheel so that the latter is maintained in a predetermined closed position against any accidental displacement. By means of this notch there is no uncertainty in turning the wheel when bringing it to its position to close the valve. The operation of this mechanism will be obvious in view of the preceding description. Thumb-wheel 34 is operated to open the by-pass 30 after which the ordinary burner may be lighted in the usual way. After a certain interval, say half an hour, the chamber 1 becomes sufficiently warm for the wax 9 to open the automatic gas cut-off valve 12 in the manner already described, after which the gas flow can continue independently of the by-pass 30. At this time the thumb-wheel 34 should be turned until the spring 35 snaps into notch 38, closing the valve. If the flame of the burner is thereafter extinguished, the automatic gas cut off operates in the usual way.

I provide means for automatically accomplishing the functions of the above manipulation. Referring particularly to Figs. 1 and 2, 40 designates a tubular receptacle which is supported adjacent to cup 1 in any convenient way, as by means of a lug 41 engaged by an ear 42 forming part of the top of the tubular receptacle 40. 43 designates a piston in the tubular receptacle 40.

supported through the rod 44 from a lever 45, and capable of a small degree of up and down movement. The lever 45 is fulcrumed at 46 on the side of the receptacle 40, and the main portion thereof lies substantially parallel with said receptacle. The upper portion extends horizontally so as to lie over the top of the receptacle 40 and provide for the attachment of the piston 43. The lower end of the vertical arm of the lever 45 projects forwardly, forming a stop 47, and is provided with a weight 48 which tends to normally throw the lever 45 and the stop 47 thereon to the position shown in Fig. 2. With this form of the invention I make use of a thumb-wheel 34ª, analogous in every way to the thumb-wheel 34, except preferably larger, and having an inwardly projecting pin 49 which moves into engagement with the stop 47 when the lever 45 is in a predetermined position. The lower end of the lever 45 with the stop 47 thereon is capable of yielding laterally to release the pin 49 unless constrained. 50 designates a weight hanging from a crank pin 51 on the front face of the wheel 34ª in such an angular position thereon as to impel the wheel rotatably when the pin 49 rests against the stop 47. Wax or similar congealing substance is poured into the tubular casing 40 and when cold and hard holds the piston 43, and consequently the lever 45 against movement. To initially light the burner, the wheel 34ª is turned by hand to the position shown in the drawings, with the pin 49 thereon in engagement with the stop 47. At such time the by-pass 30 is opened through the port 52 in the valve 32. The parts are held in these positions because the lower end of the lever 45 is restrained from lateral movement by reason of the piston 43 being submerged in the hardened wax in the receptacle 40, and because the pin 49 is in engagement with the stop 47 on said lever. The weight 50, however, holds the wheels 34ª and consequently the valve 32 under a constant tendency to turn. After a certain interval the wax in the tubular receptacle 40 becomes melted and permits the piston 43 and the lever 45 to yield, thereby releasing the pin 49 and the wheel 34ª, which moves a quarter of a turn, or thereabout, under the impulse of the weight 50 and closes the valve 32 of the by-pass 30. After this the automatic cut-off valve 12 is adapted to act in the usual way.

In case a Welsbach burner or the like is employed with my automatic gas cut off, it may be desirable to make use of a special heater to supply the necessary warmth for my automatic cut-off. In Fig. 1 I have illustrated a small branch pipe connection 53 having an outlet orifice or burner 54, the passage of which may be restricted by an adjustment screw 55. 56 designates a small metallic cage or part adapted to fit over the burner orifice 54 so as to be heated by the flame thereat. The warmth conducted downward from this metallic cage is sufficient to open the automatic gas cut-off valve 12 as already described. This form of the invention is particularly advantageous since the small pilot flame at the burner 54 is exposed at all times and is easily blown out when desired. When this flame is extinguished, the warmth therefrom ceases to be transmitted to the cut-off device which accordingly acts within a predetermined interval, say three or four minutes in ordinary cases. This gives a person time to lock up his premises and leave comfortably after the gas has been arranged to be extinguished, the gas cut-off acting a few minutes later when there is no further need for illumination. This form of the invention is also particularly adapted to gas stoves and heaters which may be operated by a rubber hose connection from the fixture. The gas is cut off as before by simply blowing out the pilot flame. If any occasion should arise causing a serious leakage of gas, as, for example, by rupture or disconnection of the hose pipe of the heater or stove, the drop in pressure would cause the pilot flame to be extinguished and the automatic gas cut-off would act.

What I claim is:

1. In an automatic gas cut-off appliance, a receptacle containing a congealing, contractile substance, a valve closed by the contraction and solidification of said substance at normal temperatures and opened by the expansion of said substance when it is melted, a by-pass for establishing communication past said valve, a valve for closing said by-pass, and a detent for retaining said last mentioned valve open.

2. In an automatic gas cut-off appliance, a receptacle containing a congealing, contractile substance, a valve closed by the contraction and solidification of said substance at normal temperatures and opened by the expansion of said substance when it is melted, a by-pass for establishing communication past said valve, a valve in said by-pass having a thumb-wheel, and a lever adapted to be engaged by said thumb-wheel to hold the last mentioned valve open.

3. In an automatic gas cut-off appliance, a receptacle containing a congealing, contractile substance, a valve closed by the contraction and solidification of said substance at normal temperatures and opened by the expansion of said substance when it is melted, a by-pass for establishing communication past said valve, a valve for said by-pass, and means for automatically closing said last mentioned valve.

4. In an automatic gas cut-off appliance, a receptacle containing a congealing, contractile substance, a valve closed by the contraction and solidification of said substance at normal temperatures and opened by the expansion of said substance when it is melted, a by-pass for establishing communication past said valve, a valve for said by-pass, and means operated by the heating of the device for automatically closing said last mentioned valve.

5. In an automatic gas cut-off appliance, a receptacle containing a congealing, contractile substance, a valve closed by the contraction and solidification of said substance at normal temperatures and opened by the expansion of said substance when it is melted, a by-pass for establishing communication past said valve, a valve in said by-pass, means for impelling said by-pass valve into closing relation, and means released by the heating of the device for retaining said by-pass valve against the closing movement.

6. In an automatic gas cut-off appliance, a receptacle containing a congealing, contractile substance, a valve closed by the contraction and solidification of said substance at normal temperatures and opened by the expansion of said substance when it is melted, a by-pass for establishing communication past said valve, a valve in said by-pass, means for normally impelling said by-pass valve into closing relation, a receptacle containing a substance adapted to melt at a temperature slightly above normal, and means held against displacement by said substance for restraining said by-pass valve against closing movement.

7. In an automatic gas cut-off appliance, a receptacle containing a congealing, contractile substance, a valve closed by the contraction and solidification of said substance at normal temperatures and opened by the expansion of said substance when it is melted, means whereby an ordinary burner may be fixed upon said appliance, and a separate auxiliary burner for maintaining said appliance heated in use.

8. In an automatic gas cut-off appliance, a receptacle containing a congealing, contractile substance, a valve closed by the contraction and solidification of said substance at normal temperatures and opened by the expansion of said substance when it is melted, means whereby an ordinary burner may be fixed upon said appliance, and a separate auxiliary burner including a small metallic cage exposed to the flame of said auxiliary burner, for maintaining said appliance heated in use.

9. In an automatic gas cut-off appliance, a cup or chamber having a central tube, a float having a valve closing on said tube, and a guiding ring adjustably received within said chamber to limit the upward movement of said float.

10. In an automatic gas cut-off appliance, a cup or chamber having a central tube, a float having upwardly projecting prongs and having a valve closing over said tube, and a guiding ring threaded into the interior of said chamber and adapted to be positioned to limit the upward displacement of said float and maintain the latter against lateral movement against the walls of the chamber.

11. In an automatic gas cut-off appliance, a cup or chamber having a lower face with a non-circular hole, a collar having a portion of corresponding non-circular section, a tube threaded into said collar and having a flange coöperating therewith to engage the bottom of said chamber, and a float having a valve for closing said tube.

In witness whereof, I subscribe my signature, in the presence of two witnesses.

HENRY NEEMANN

Witnesses:
WM. M. STOCKBRIDGE,
WALDO M. CHAPIN.